(12) United States Patent
Mizuno et al.

(10) Patent No.: US 8,050,506 B2
(45) Date of Patent: Nov. 1, 2011

(54) IMAGE ENHANCEMENT DEVICE

(75) Inventors: Yusuke Mizuno, Osaka (JP); Yusuke Nara, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 1083 days.

(21) Appl. No.: 11/386,739

(22) Filed: Mar. 23, 2006

(65) Prior Publication Data

US 2006/0222255 A1 Oct. 5, 2006

(30) Foreign Application Priority Data

Mar. 29, 2005 (JP) ................................. 2005-093970

(51) Int. Cl.
*G06K 9/36* (2006.01)
*G06K 9/46* (2006.01)
(52) U.S. Cl. ...................................................... 382/239
(58) Field of Classification Search .................... None
See application file for complete search history.

(56) References Cited

U.S. PATENT DOCUMENTS

| | | | | |
|---|---|---|---|---|
| 5,048,111 | A * | 9/1991 | Jones et al. | 382/248 |
| 6,259,819 | B1 * | 7/2001 | Andrew et al. | 382/248 |
| 6,496,607 | B1 * | 12/2002 | Krishnamurthy et al. | 382/282 |
| 6,801,665 | B1 * | 10/2004 | Atsumi et al. | 382/239 |
| 6,853,466 | B1 * | 2/2005 | Harada et al. | 358/1.9 |
| 6,891,973 | B1 * | 5/2005 | Atsumi et al. | 382/232 |
| 6,917,384 | B1 * | 7/2005 | Fukushima | 348/333.03 |
| 6,937,773 | B1 * | 8/2005 | Nozawa et al. | 382/243 |
| 7,039,250 | B2 * | 5/2006 | Kuroiwa | 382/248 |
| 7,068,848 | B2 * | 6/2006 | Park et al. | 382/240 |
| 7,092,569 | B1 * | 8/2006 | Kinjo | 382/190 |
| 7,187,798 | B1 * | 3/2007 | Payton | 382/166 |
| 7,231,522 | B2 | 6/2007 | Murakami et al. | |
| 7,236,629 | B2 * | 6/2007 | Cooper et al. | 382/171 |
| 7,359,560 | B2 | 4/2008 | Mossakowski | |
| 7,400,754 | B2 * | 7/2008 | Jung et al. | 382/128 |

(Continued)

FOREIGN PATENT DOCUMENTS

JP 2001-45484 2/2001

(Continued)

OTHER PUBLICATIONS

Office Action issued Apr. 12, 2011, in Japanese Patent Application No. 2005-093970 with partial English translation.

*Primary Examiner* — Yuzhen Ge
(74) *Attorney, Agent, or Firm* — Oblon, Spivak, McClelland, Maier & Neustadt, L.L.P.

(57) ABSTRACT

An image enhancement device is obtained which is capable of extracting, as regions of interest, still objects or objects with smaller motion vectors, or regions located out of the central area of an image. An image processing module (22) applies memorized-color correction to image data, and then stores, in an SDRAM (7) through a memory interface (26), information about the positions of the memorized-color-corrected pixels and information about the application levels (correction levels) applied to the memorized-color-corrected pixels. A mask signal generating module (23) refers to the positional information stored in the SDRAM (7) to extract the memorized-color-corrected regions of the image data as regions of interest. Also, the mask signal generating module (23) refers to the information about the correction levels stored in the SDRAM (7) to set priorities of the regions of interest in such a way that higher priorities are assigned to regions of interest that are memorized-color-corrected at higher levels (i.e., with larger amounts of correction).

6 Claims, 16 Drawing Sheets

U.S. PATENT DOCUMENTS

2004/0131264 A1    7/2004    Sakuyama et al.

FOREIGN PATENT DOCUMENTS

| | | |
|---|---|---|
| JP | 2001-112004 | 4/2001 |
| JP | 2001-119696 | 4/2001 |
| JP | 2001-145101 | 5/2001 |
| JP | 2001-160062 | 6/2001 |
| JP | 2001-204030 | 7/2001 |
| JP | 2001-251624 | 9/2001 |
| JP | 2002-190945 | 7/2002 |
| JP | 2004/165760 | 6/2004 |
| JP | 2004-235990 | 8/2004 |
| JP | 2004-534432 | 11/2004 |

* cited by examiner

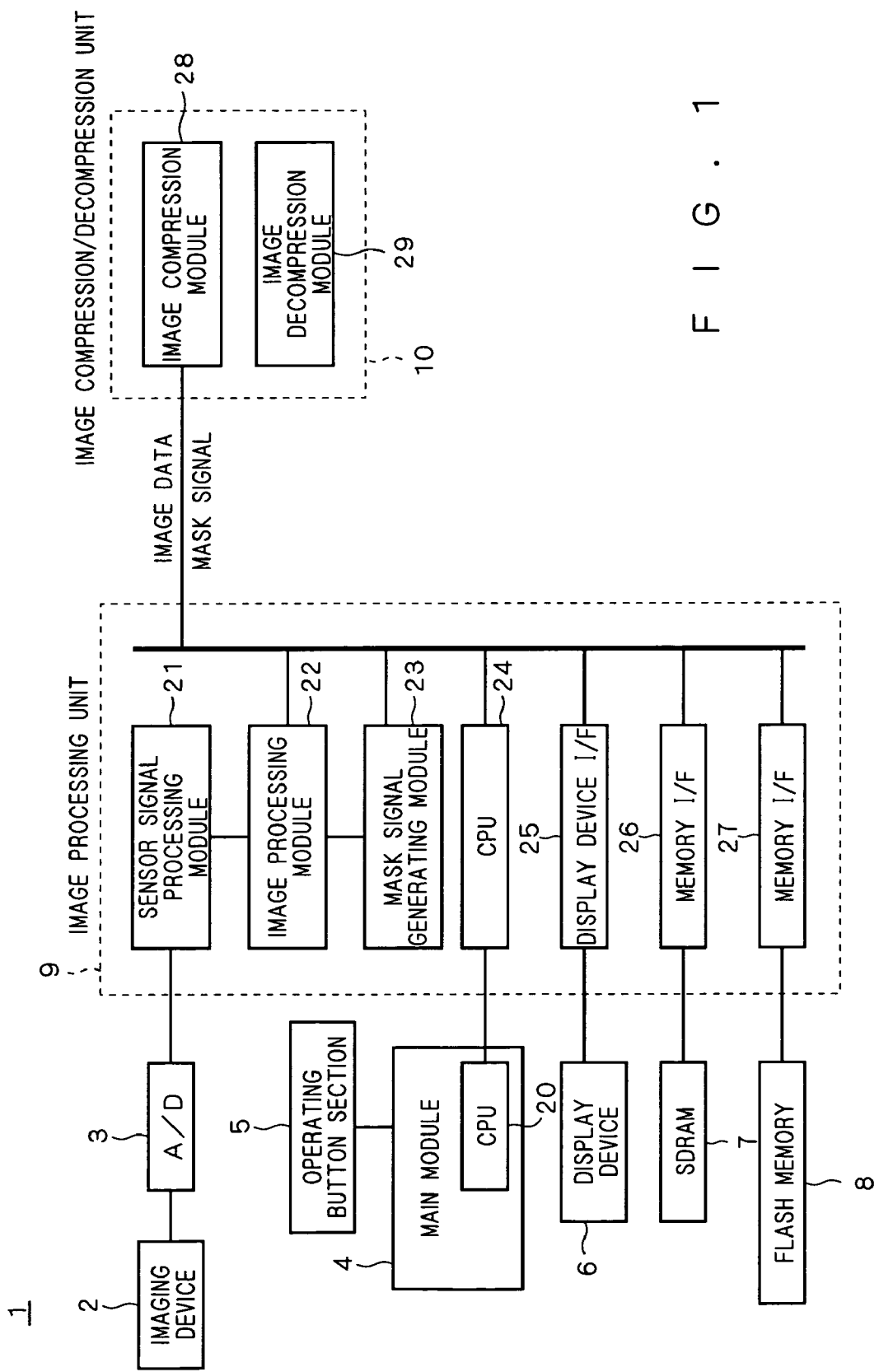

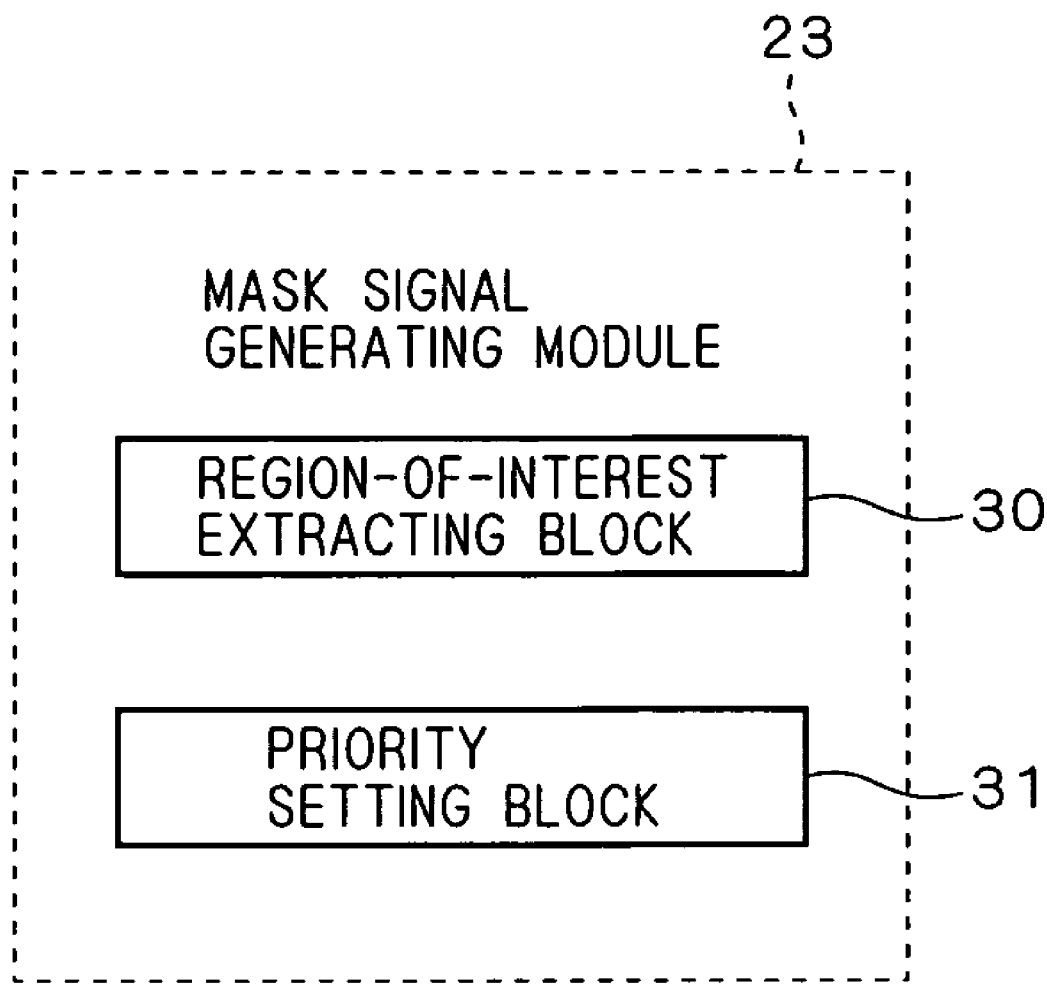

F I G . 3
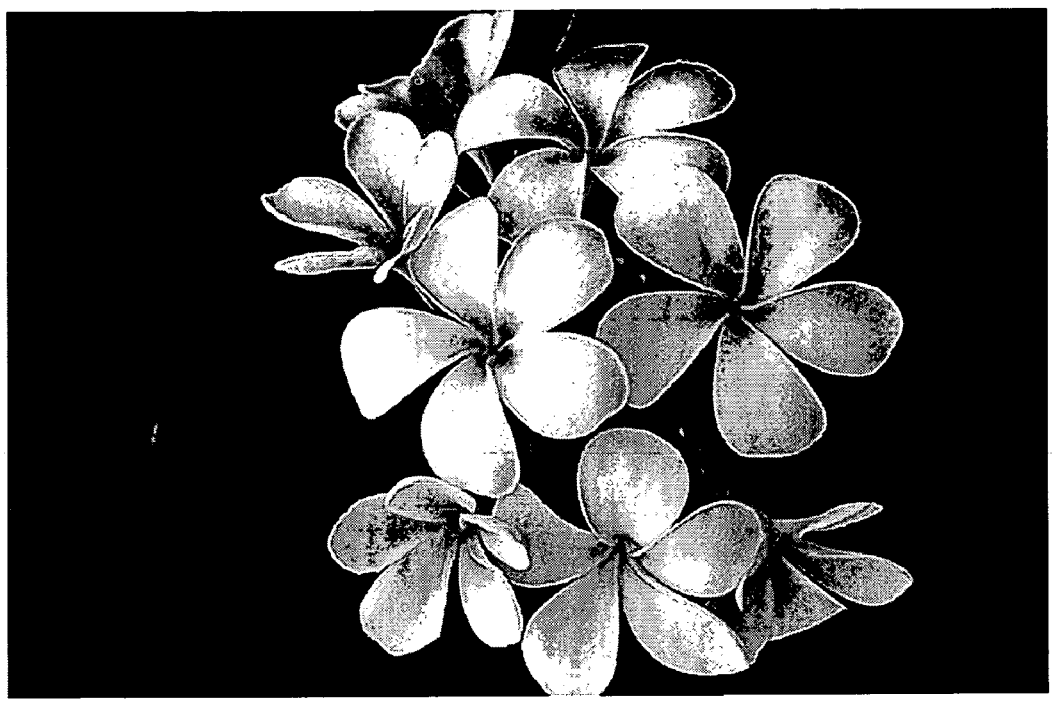

F I G . 4
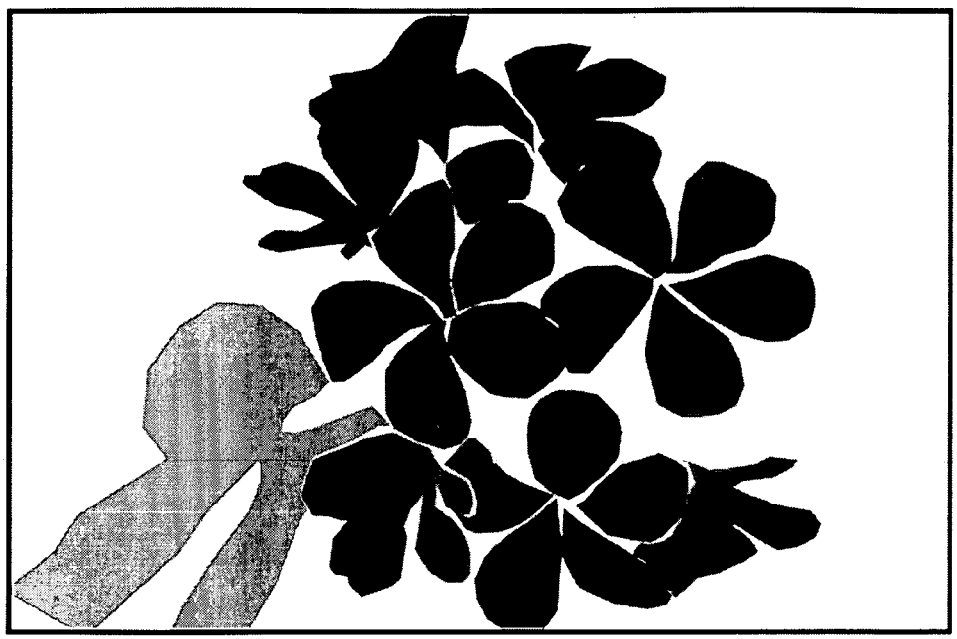

FIG. 7

F I G . 1 0
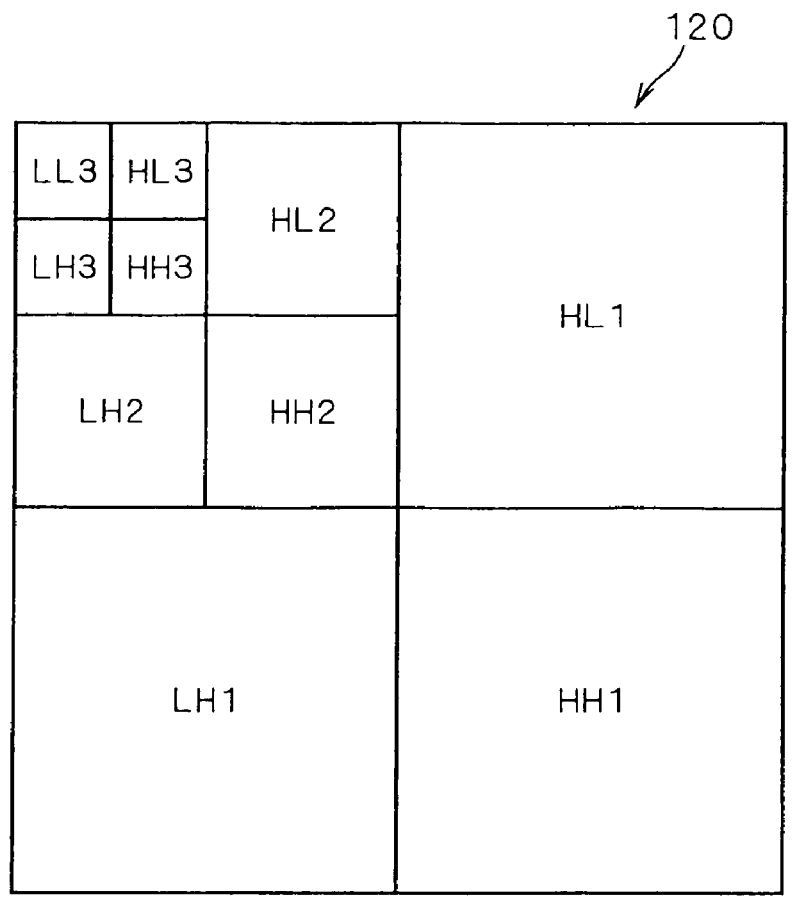
BACKGROUND ART

F I G . 1 1
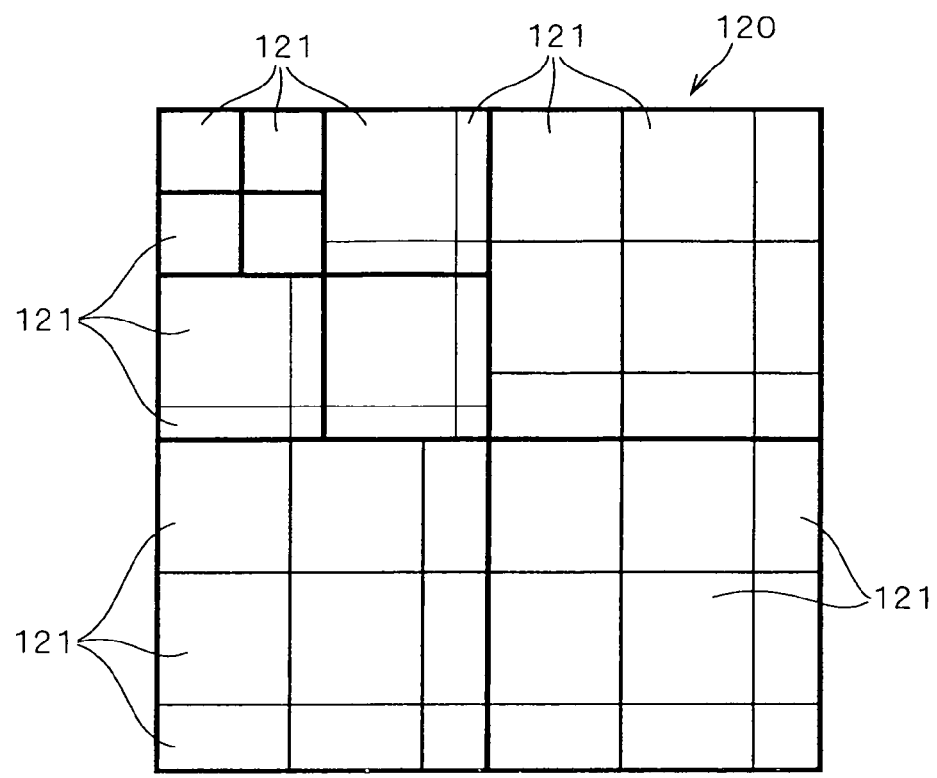
BACKGROUND ART

BACKGROUND ART

BACKGROUND ART

FIG. 15

Table J-24 — Recommended frequency weighting

| level | Viewing distance 1000 | | | Viewing distance 2000 | | | Viewing distance 4000 | | |
|---|---|---|---|---|---|---|---|---|---|
| | HL | LH | HH | HL | LH | HH | HL | LH | HH |
| 5 | 1 | 1 | 1 | 1 | 1 | 1 | 1 | 1 | 1 |
| 4 | 1 | 1 | 1 | 1 | 1 | 1 | 1 | 1 | 0,731 668 |
| 3 | 1 | 1 | 1 | 1 | 1 | 0,727 203 | 0,564 344 | 0,564 344 | 0,285 968 |
| 2 | 1 | 1 | 0,727 172 | 0,560 841 | 0,560 841 | 0,284 193 | 0,179 609 | 0,179 609 | 0,043 903 |
| 1 | 0,560 805 | 0,560 805 | 0,284 173 | 0,178 494 | 0,178 494 | 0,043 631 | 0,014 774 | 0,014 774 | 0,000 573 |

FIG. 16

Table J-25 Recommended frequency weighting for multiple component (colour) images

| Component | Lev | Viewing distance 1000 | | | Viewing distance 1700 | | | Viewing distance 3000 | | |
|---|---|---|---|---|---|---|---|---|---|---|
| | | HL | LH | HH | HL | LH | HH | HL | LH | HH |
| Y (Y0) | 5 | 1 | 1 | 1 | 1 | 1 | 1 | 1 | 1 | 1 |
| | 4 | 1 | 1 | 1 | 1 | 1 | 1 | 1 | 1 | 1 |
| | 3 | 1 | 1 | 1 | 1 | 1 | 1 | 0,921 045 | 0,921 045 | 0,848 324 |
| | 2 | 0,998 276 | 0,998 276 | 0,996 555 | 0,861 593 | 0,861 593 | 0,742 342 | 0,410 628 | 0,410 628 | 0,182 760 |
| | 1 | 0,756 353 | 0,756 353 | 0,573 057 | 0,307 191 | 0,307 191 | 0,108 920 | 0,038 487 | 0,038 487 | 0,003 075 |
| Cb (Y1) | 5 | 0,883 196 | 0,883 196 | 0,833 582 | 0,818 766 | 0,818 766 | 0,745 875 | 0,717 086 | 0,717 086 | 0,613 777 |
| | 4 | 0,793 487 | 0,793 487 | 0,712 295 | 0,689 404 | 0,689 404 | 0,579 220 | 0,539 437 | 0,539 437 | 0,403 353 |
| | 3 | 0,650 482 | 0,650 482 | 0,531 700 | 0,501 652 | 0,501 652 | 0,362 279 | 0,319 773 | 0,319 773 | 0,185 609 |
| | 2 | 0,450 739 | 0,450 739 | 0,309 177 | 0,280 068 | 0,280 068 | 0,152 290 | 0,124 021 | 0,124 021 | 0,044 711 |
| | 1 | 0,230 503 | 0,230 503 | 0,113 786 | 0,097 816 | 0,097 816 | 0,031 179 | 0,023 308 | 0,023 308 | 0,003 413 |

FIG. 17

Table J-25 — Recommended frequency weighting for multiple component (colour) images (continued)

| Comp | Lev | Viewing distance 1000 | | | Viewing distance 1700 | | | Viewing distance 3000 | | |
|---|---|---|---|---|---|---|---|---|---|---|
| | | HL | LH | HH | HL | LH | HH | HL | LH | HH |
| Cr (Y2) | 5 | 0,910 877 | 0,910 877 | 0,872 378 | 0,860 885 | 0,860 885 | 0,803 172 | 0,780 091 | 0,780 091 | 0,695 128 |
| | 4 | 0,841 032 | 0,841 032 | 0,776 180 | 0,757 626 | 0,757 626 | 0,665 951 | 0,631 632 | 0,631 632 | 0,509 729 |
| | 3 | 0,725 657 | 0,725 657 | 0,625 103 | 0,598 537 | 0,598 537 | 0,470 893 | 0,428 659 | 0,428 659 | 0,287 593 |
| | 2 | 0,552 901 | 0,552 901 | 0,418 938 | 0,388 492 | 0,388 492 | 0,248 566 | 0,211 871 | 0,211 871 | 0,100 658 |
| | 1 | 0,336 166 | 0,336 166 | 0,200 507 | 0,177 435 | 0,177 435 | 0,077 130 | 0,060 277 | 0,060 277 | 0,014 977 |

IMAGE ENHANCEMENT DEVICE

BACKGROUND OF THE INVENTION

1. Field of the Invention

The present invention relates to an image enhancement device that enhances portions of an image by assigning larger amounts of code to regions of interest extracted from the image data.

2. Description of the Background Art

Images, particularly multi-valued images, contain huge amounts of information so that storing or transmitting images involves storage or transmission of huge amounts of data. Accordingly, high-efficiency coding is used to reduce the amounts of data by, e.g., removing redundancy of images or altering the contents of images to such an extent that the deterioration of image quality is visually unrecognizable.

On the other hand, uniformly applying the high-efficiency coding to the entire image undesirably lowers image quality of highly significant regions in the image. It is therefore desirable to apply the high-efficiency coding only to less significant regions in the image so as to reduce the total amount of data while avoiding deterioration of image quality of highly significant regions.

As a next-generation high-efficiency image data coding scheme, the ISO (International Organization for Standardization) and ITU-T (International Telecommunication Union-Telecommunication Standardization Sector) provide the JPEG 2000 (Joint Photographic Experts Group 2000) system. As compared with the currently dominating JPEG (Joint Photographic Experts Group) system, the JPEG 2000 system has superior functions and is characterized in that it adopts the DWT (Discrete Wavelet Transform) as orthogonal transform and the EBCOT (Embedded Block Coding with Optimized Truncation), implementing bit-plane coding, as entropy coding.

FIG. 9 is a functional block diagram schematically showing the configuration of a compression coding device 100 that performs a compression image coding based on the JPEG 2000. Now, referring to FIG. 9, the compression coding procedure according to the JPEG 2000 system will be briefly described.

An image signal inputted to the compression coding device 100 undergoes, as needed, DC level shifting in a DC level shifting block 102, and is then inputted to a color space transform block 103. The color space transform block 103 applies color space transform to the image signal provided from the DC level shifting block 102. For example, an RGB signal inputted to the color space transform block 103 is transformed into a YCbCr signal (a signal composed of a luminance signal Y and color difference signals Cb and Cr).

A tiling block 104 divides the image signal provided from the color space transform block 103 into a plurality of rectangular-shaped region components called "tiles". A DWT block 105 applies an integer type or real-number type DWT on a tile basis, to the image signal inputted from the tiling block 104, and the DWT block 105 outputs the resultant transform coefficients. The DWT adopts one-dimensional filters to divide a two-dimensional image signal into a high-band component (high-frequency component) and a low-band component (low-frequency component) in each of vertical and horizontal directions. The JPEG 2000 basic system adopts an octave division scheme that recursively band-divides only a band component that has been divided into the low band both in vertical and horizontal directions. The number of recursive band-divisions is called a decomposition level.

FIG. 10 is a schematic diagram illustrating a two-dimensional image 120 that has undergone a DWT with cubic decomposition levels according to the octave division scheme. At the decomposition level 1, the two-dimensional image 120 is divided into four band components including HH1, HL1, LH1, and LL1 (not shown) through sequential applications of the above-mentioned one-dimensional filters in vertical and horizontal directions. Where, "H" indicates a high-band component and "L" indicates a low-band component. For example, HL1 is a band component composed of a high-band component H in the horizontal direction and a low-band component L in the vertical direction at the decomposition level 1. The notation is generalized as "XYn" (X, Y are H or L, and n is an integer of 1 or more), which indicates a band component composed of a band component X in the horizontal direction and a band component Y in the vertical direction at a decomposition level n. At the decomposition level 2, the low-band component LL1 is band-divided into HH2, HL2, LH2, and LL2 (not shown). At the decomposition level 3, the low-band component LL2 is further band-divided into HH3, HL3, LH3, and LL3. While FIG. 10 shows an example of DWT of cubic decomposition levels, the JPEG 2000 system generally adopts decomposition levels of degree three to degree eight.

Referring to FIG. 9, a quantization block 106 applies, as needed, a scalar quantization to the transform coefficients inputted from the DWT block 105. The quantization block 106 also has a function of performing bit shifting to give priority to image quality of regions of interest (ROIs) having greater significance in the image, on the basis of a signal input from an ROI block 107. The scalar quantization in the quantization block 106 is not done when a reversible (lossless) transform is performed. The JPEG 2000 system prepares two kinds of quantization means including the scalar quantization by the quantization block 106 and a post-quantization (truncation) described later.

As for methods for extracting regions of interest, Japanese Patent Application Laid Open Nos. 2004-200739 and 2001-119696 disclose techniques of comparing a plurality of images to extract objects with larger motion vectors as regions of interest. Also, there is a simple method that extracts tiles in a central portion of an image as a region of interest on the assumption that the central portion of the image is important. Furthermore, there is a method in which, with a plurality of templates prepared for various objects, a matching is performed between a taken image and the templates, and when the taken image includes an object matching with a template, that object is extracted as a region of interest.

Typical usage of ROI includes a Max-shift scheme as an optional function of the JPEG 2000.

The Max-shift scheme specifies ROI portions in an arbitrary manner and compresses those portions with higher image quality while compressing the non-ROI portion with lower image quality. Specifically, first, the wavelet transform is applied to an original image to obtain a distribution of wavelet coefficients, and a value Vm of the largest wavelet coefficient in the coefficient distribution corresponding to the non-ROI portion is obtained. Then, a number of bits, S, is obtained so that S>=max (Vm), and only the wavelet coefficients of the ROI portions are shifted by S bits in the increasing direction. For example, when the value of Vm is "255" in decimal (i.e., "11111111" in binary), then S=8, and when the value of Vm is "128" in decimal (i.e., "10000000" in binary), then S=8, too, in which cases the wavelet coefficients of the ROI portions are shifted by S=8 bits in the increasing direction. Thus, the compression ratio is set lower for the ROI portions than for the non-ROI portion, whereby compressed data of higher image quality can be obtained about the ROI portions.

Transform coefficients outputted from the quantization block 106 undergo a block-based entropy coding by a coefficient bit modeling block 108 and an arithmetic coding block 109 according to the EBCOT mentioned above, which is followed by rate control by a code rate control block 110. Specifically, the coefficient bit modeling block 108 divides the band components of the input transform coefficients into a plurality of regions, called "code blocks", of, e.g., 16×16, 32×32, or 64×64, and further decomposes each code block into a plurality of bit planes composed of two-dimensional arrangements of bits.

FIG. 11 is a schematic diagram illustrating the two-dimensional image 120 that has been divided into a plurality of code blocks 121. FIG. 12 is a schematic diagram illustrating n bit planes $122_0$ to $122_{n-1}$ (n: a natural number) that forms a code block 121. As shown in FIG. 12, when the binary value 123 of the transform coefficient at a point in the code block 121 is "011 . . . 0", individual bits forming the binary value 123 are decomposed so that they belong respectively to the bit planes $122_{n-1}$, $122_{n-2}$, $122_{n-3}$, . . . , $122_0$. The bit plane $122_{n-1}$ is the most significant bit plane composed only of the most significant bits (MSBs) of the transform coefficients and the bit plane 1220 is the least significant bit plane composed only of the least significant bits (LSBs) of the transform coefficients.

The coefficient bit modeling block 108 performs a context judgment of each bit in each bit plane $122_k$ (k=0 to n−1), and as shown in FIG. 13, it decomposes a bit plane $122_k$ into three kinds of coding passes, i.e., SIG pass (SIGnificance propagation pass), MR pass (Magnitude Refinement pass), and CL (CLeanup pass), according to the significance of each bit (the results of judgement). The algorithm of the context judgement about each coding pass is defined by the EBCOT. According to the definition, "significant" means a state in which it is known in the preceding coding process that a target coefficient is not zero, and "insignificant" means a state in which the coefficient value is zero or may be zero.

The coefficient bit modeling block 108 performs bit-plane coding using the three kinds of coding passes, including the SIG pass (a coding pass of insignificant coefficients around which there is a significant coefficient or coefficients), the MR pass (a coding pass of significant coefficients), and the CL pass (a coding pass of the remaining coefficient information not corresponding to the SIG pass and MR pass). The bit-plane coding is achieved by scanning the bits of each bit plane on a 4-bit basis, starting from the most significant bit plane to the least significant bit plane, and judging whether there are significant coefficients. The number of bit planes composed only of insignificant coefficients (0 bits) is recorded in a packet header and the actual coding is started at a bit plane where a significant coefficient appears first. The coding-starting bit plane is coded only with the CL pass and the bit planes below that bit plane are sequentially coded with the three kinds of coding passes.

FIG. 14 is a diagram showing an R-D curve that represents a relation between rate (amount of code; R) and distortion (D). In FIG. 14, $R_1$ shows the rate before bit-plane coding, $R_2$ shows the rate after bit-plane coding, $D_1$ shows the distortion before bit-plane coding, and $D_2$ shows the distortion after bit-plane coding. Also, A, B, C are labels representing the above-described coding passes. As to the route from the starting point $P_1$ ($R_1$, $D_1$) to the end point $P_2$ ($R_2$, $D_2$), it is preferable, for more efficient coding, to adopt the route of concave-shaped curve A-B-C than the route of convex-shaped curve C-B-A. It is known that such a concave-shaped curve can be implemented by coding from the most significant bit plane to the least significant bit plane.

Referring to FIG. 9, according to the results of the context judgement, the arithmetic coding block 109, using an MQ coder, applies arithmetic coding on a coding-pass basis to the rows of coefficients inputted from the coefficient bit modeling block 108. There is also a mode of bypass processing in which part of the rows of coefficients inputted from the coefficient bit modeling block 108 are not arithmetic-coded.

The code rate control block 110 applies post-quantization of truncating lower-order bit planes of the code rows inputted from the arithmetic coding block 109, so as to control the final amount of code. The bit stream generating block 111 multiplexes the code rows inputted from the code rate control block 110 and additional information (header information, layer structure, scalability information, quantization tables, etc.) to generate a bit stream, which is outputted as a compressed image.

As mentioned above, methods of extracting regions of interest include a method of extracting objects with larger motion vectors, a method of extracting a central portion of an image as a region of interest, and a method of performing object template matching.

However, according to the method of extracting objects with larger motion vectors as regions of interest, it is difficult to extract still objects and objects with smaller motion vectors (e.g., plants and scenery) as the regions of interest. Moreover, obtaining motion vectors requires comparing at least two successive images, which leads to increased circuit scale and more complex processing.

According to the method of extracting a central portion of an image as a region of interest, a significant object cannot be extracted as a region of interest when the significant object is not contained in central tiles of the image.

Also, the method of adopting object template matching requires increased circuit scale because this method requires previously storing a huge amount of template data about various objects in memory.

SUMMARY OF THE INVENTION

An object of the present invention is to provide an image enhancement device that is capable of extracting, as regions of interest, still objects, objects with smaller motion vectors, and portions located out of the central area of an image, without requiring increased circuit scale and more complex processing.

According to a first aspect of the present invention, an image enhancement device includes a region-of-interest extracting block that extracts a plurality of regions of interest from input image data, a priority setting block that sets priorities respectively to the regions of interest, and a code rate control block that controls the code rate in such a way that larger amounts of code are assigned to the regions of interest having higher priorities.

According to a second aspect of the invention, in the image enhancement device of the first aspect, the region-of-interest extracting block extracts the regions of interest by extracting at least one of a particular color and a particular object from the image data.

According to a third aspect of the invention, the image enhancement device of the second aspect further includes an image processing block that applies a memorized-color correction to the image data, wherein the region-of-interest extracting block extracts, as the regions of interest, regions in the image data that are subjected to the memorized-color correction, and the priority setting block sets the priorities in such a way that higher priorities are assigned to the regions of interest that are subjected to the memorized-color correction at higher application levels.

According to a fourth aspect of the invention, the image enhancement device of the second aspect further includes an image processing block that applies an edge emphasis process to the image data, wherein the region-of-interest extracting block extracts, as the regions of interest, regions in the image data that are subjected to the edge emphasis process, and the priority setting block sets the priorities in such a way that higher priorities are assigned to the regions of interest that are subjected to the edge emphasis process at higher application levels.

According to a fifth aspect of the invention, the image enhancement device of the second aspect further includes an image processing block that applies a noise reduction process to the image data, and the region-of-interest extracting block extracts, as regions of no-interest, regions in the image data that are subjected to the noise reduction process.

According to a sixth aspect of the invention, in the image enhancement device of the second aspect, the image data is data about an image taken by a camera that is capable of selecting an image mode, and the region-of-interest extracting block extracts, as the regions of interest, at least one of the particular color and the particular object that is previously determined for each image mode.

According to a seventh aspect of the invention, the image enhancement device of the first aspect further includes a wavelet transform block that recursively band-divides the image data into a high-band component and a low-band component through a wavelet transform, so as to generate a plurality of sub-bands having different resolutions, wherein the image data is data about an image taken by a camera that has a preview function and an image storing function, and wherein, for a preview, the code rate control block applies the amount-of-code assignment control only to a first sub-band having a resolution necessary for the preview, and for storing of an image, the code rate control block applies the amount-of-code assignment control to a second sub-band having a higher resolution than the first sub-band.

According to an eighth aspect of the invention, in the image enhancement device of the seventh aspect, the camera has a function of selecting a data size of an image to be stored when storing an image, and for the storing of an image, the code rate control block applies the amount-of-code assignment control only to the second sub-band that corresponds to the selected data size.

According to the image enhancement device of the first aspect, it is possible to achieve compression coding while maintaining image quality of higher-priority regions of interest, and thus to enhance image portions corresponding to the regions of interest while compressively coding the entire image.

According to the image enhancement device of the second aspect, it is possible to extract still objects and objects with smaller motion vectors as regions of interest, and there is no need for increased circuit scale and more complex processing. Also, it is possible to extract an important object as a region of interest even when the important object is not included in tiles in a central area. Moreover, increased circuit scale is not needed because there is no need to previously store a huge amount of template data about various objects in memory.

According to the image enhancement device of the third aspect, it is possible to clearly enhance memorized-color portions where differences in color are likely to give an unfavorable impression on a viewer, particularly, portions that are memorized-color-corrected at higher correction levels and that will be especially important in the image data.

According to the image enhancement device of the fourth aspect, it is possible to clearly enhance the contours of objects that are likely to attract viewer's attention, particularly, portions that are contour-emphasized at higher application levels and that will be especially important in the image data.

According to the image enhancement device of the fifth aspect, noise is never set as a region of interest and so it is possible to previously avoid the problem that noise is undesirably enhanced.

According to the image enhancement device of the sixth aspect, it is possible to clearly enhance, according to the image mode, an object that is the target of the photographing by a user (for example, a person in a portrait mode).

According to the image enhancement device of the seventh aspect, it is possible to avoid unnecessary, wasteful operations and hence to shorten the processing time for making a preview display.

According to the image enhancement device of the eighth aspect, it is possible to avoid unnecessary, wasteful processing and hence to shorten processing time, and also to allow generation of an image-compressed file suitable for the purpose of the user.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram illustrating the configuration of a mobile phone device equipped with a digital camera function according to a preferred embodiment of the present invention;

FIG. 2 is a functional block diagram schematically showing functions of a mask signal generating module;

FIG. 3 is a diagram showing an example of an image that has undergone memorized-color correction by an image processing module;

FIG. 4 is a diagram showing an example of a mask signal generated for the image shown in FIG. 3;

FIG. 7 is a diagram illustrating reordering and bit-shifting of rows of code based on ROI setting information;

FIG. 10 is a schematic diagram illustrating a two-dimensional image that has undergone a DWT with cubic decomposition levels according to an octave division scheme;

FIG. 11 is a schematic diagram showing a two-dimensional image divided into a plurality of code blocks;

FIGS. 15 to 17 show tables of values of Energy weighting factors.

DESCRIPTION OF THE PREFERRED EMBODIMENTS

Figure 5:
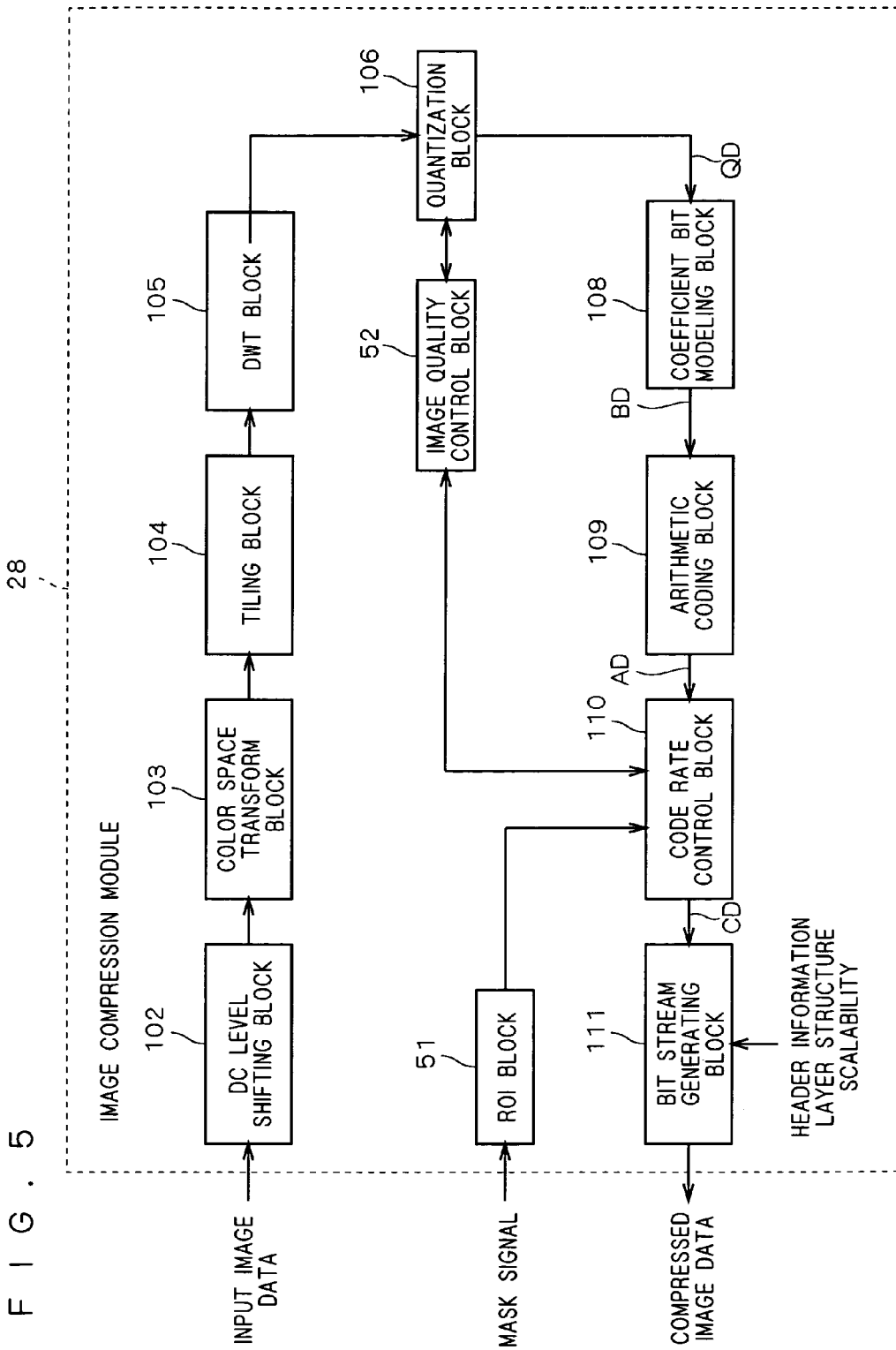
FIG. 5 is a block diagram illustrating the configuration of an image compression module.

A preferred embodiment of the image enhancement device according to the present invention will now be described, where an application of the invention to a mobile phone device equipped with a digital camera function will be explained by way of example.

FIG. 1 is a block diagram illustrating the configuration of a mobile phone mobile phone device 1 includes an imaging device 2 such as a CCD or CMOS image sensor, an A/D converter 3 connected to the imaging device 2, a main module 4 for controlling the user interface and telephoning function as a mobile phone, an operating button section 5 connected to the main module 4 and operated by a user, a display device 6 such as a liquid crystal display, an SDRAM 7 and a flash memory 8, an image processing unit 9 connected to the A/D converter 3, the main module 4, the display device 6, the SDRAM 7, and the flash memory 8, and an image compression/decompression unit 10 connected to the image processing unit 9.

The main module 4 includes a CPU 20 for controlling operations of the main module 4. The image processing unit 9 includes a sensor signal processing module 21, an image processing module 22, a mask signal generating module 23, a CPU 24 for controlling operations of the entire image processing unit .9, a display device interface 25 connected to the display device 6, a memory interface 26 connected to the SDRAM 7, and a memory interface 27 connected to the flash memory 8. The image compression/decompression unit 10 includes an image compression module 28 and an image decompression module 29.

An image signal outputted from the imaging device 2 is converted by the A/D converter 3 into digital image data, and inputted to the image processing unit 9. The sensor signal processing module 21 applies pre-processes, such as white balance control and black level correction, to the image data inputted from the A/D converter 3. The image processing module 22 applies various image processings, such as pixel interpolation, tone correction, memorized-color correction, edge emphasis, noise reduction, to the image data inputted from the sensor signal processing module 21.

FIG. 2 is a functional block diagram schematically showing functions of the mask signal generating module 23. As shown in FIG. 2, the mask signal generating module 23 includes a region-of-interest extracting block 30 that extracts a plurality of regions of interest from the image data outputted from the image processing module 22 of FIG. 1, and a priority setting block 31 that assigns priorities respectively to the extracted regions of interest, and the mask signal generating module 23 generates and outputs a mask signal that defines the regions of interest and the priorities. The mask signal generating module 23 may be omitted when the functions of the mask signal generating module 23 are implemented by the CPU 24 shown in FIG. 1.

Now, referring to FIGS. 1 and 2, the extraction of regions of interest and the setting of priorities will be described.

<First Method>

As mentioned above, the image processing module 22 has a function of performing memorized-color correction. The memorized-color correction is a process of correcting particular colors in an image (e.g., skin color, blue, green, etc.) to colors that man memorizes as beautiful (memorized colors). While known memorized-color correction schemes include a three-dimensional look-up table reference scheme, a matrix calculation scheme, and the like, the preferred embodiment can adopt any arbitrary scheme. The memorized-color correction process is not described in detail herein because the processing itself is well known.

The image processing module 22 applies the memorized-color correction to the input image data and stores, in the SDRAM 7 through the memory interface 26, information about the positions of memorized-color-corrected pixels and information about the application levels (correction levels) applied to the individual memorized-color-corrected pixels. The region-of-interest extracting block 30 refers to the positional information stored in the SDRAM 7 to extract the memorized-color-corrected regions of the image data as regions of interest. The priority setting block 31 refers to the information about the correction levels stored in the SDRAM 7 to set priorities in such a way that higher priorities are assigned to regions of interest that are memorized-color corrected at higher correction levels (i.e., with larger amounts of correction). The setting of priorities may be manually achieved through operations of the operating button section 5 by a user. The mask signal generating module 23 generates a mask signal using the regions of interest extracted by the region-of-interest extracting block 30 and the priorities set by the priority setting block 31.

FIG. 3 is a diagram showing an example of an image that has undergone the memorized-color correction by the image processing module 22, and FIG. 4 is a diagram showing an example of a mask signal generated for the image shown in FIG. 3. In the example of FIG. 4, a plurality of memorized-color-corrected regions are classified into four levels according to the correction levels. The darkest color regions correspond to a region of interest ROI1 with the highest memorized-color-correction level, and the lightest color regions correspond to a region of interest ROI4 with the lowest correction level. The uncolored region (non-ROI) is a region of no-interest that is not memorized-color-corrected.

According to the first method, the region-of-interest extracting block 30 extracts regions of interest by extracting regions of the image data that are memorized-color-corrected by the image processing module 22, and the priority setting block 31 sets priorities in such a way that higher priorities are assigned to regions of interest that are memorized-color-corrected at higher correction levels. Accordingly, in the image enhancement processing by the image compression module 28 described later, it is possible to clearly enhance the memorized-color portions where differences in color are likely to give an unfavorable impression on a viewer, particularly, the portions that are assigned higher memorized-color-correction levels and that will be especially important in the image data.

<Second Method>

As mentioned above, the image processing module 22 has a function of performing edge emphasis processing (sharpness processing). The edge emphasis processing extracts edges by detecting points where density varies in image data, and corrects the image data in the edge portions to emphasize the edges. While various processing schemes of edge emphasis are known and there are various kinds of sharpness filters, this preferred embodiment may adopt any arbitrary processing scheme. The edge emphasis process is not described in detail herein because the processing itself is well known.

The image processing module 22 applies the edge emphasis to the input image data and then stores in the SDRAM 7 through the memory interface 26, information about the positions of edge-emphasized pixels and information about the application levels applied to the individual edge-emphasized pixels (the amounts of correction applied to individual image data pixels). The region-of-interest extracting block 30 refers to the positional information stored in the SDRAM 7 to extract the edge-emphasized portions of the image data as regions of interest. The priority setting block 31 refers to the information about application levels stored in the SDRAM 7 to set priorities in such a way that higher priorities are assigned to regions of interest that are edge-emphasized at higher application levels (i.e., regions of interest subjected to larger amounts of correction). The setting of priorities may be manually achieved through operations of the operating button section 5 by a user. The mask signal generating module 23 generates a mask signal using the regions of interest extracted by the region-of-interest extracting block 30 and the priorities set by the priority setting block 31.

According to the second method, the region-of-interest extracting block 30 extracts, as regions of interests, regions of the image data that are edge-emphasized by the image processing module 22, and the priority setting block 31 sets priorities in such a way that higher priorities are assigned to regions of interest that are edge-emphasized at higher application levels. Accordingly, in the image enhancement processing by the image compression module 28 described later, it is possible to clearly enhance the edges of objects that are likely to attract viewer's attention, particularly, portions that are edge-emphasized at higher application levels and that will be especially important in the image data. Also, extracting edge-emphasized regions as regions of interest avoids the problem that the edges to be emphasized are assigned smaller amounts of code and become unclear during the compression coding by the image compression module 28.

The region-of-interest extracting block 30 may extract high-frequency components in the image data as regions of interest, independently of whether the edge emphasis is done or not, and the priority setting block 31 may set priorities in such a way that higher priorities are assigned to higher-frequency regions and lower priorities are assigned to lower-frequency regions.

<Third Method>

As mentioned earlier, the image processing module 22 has a function of performing noise reduction processing. The noise reduction processing is a process in which a correlation between pixel levels of a target pixel and surrounding pixels is analyzed to determine whether the target pixel is noise or not, and if the target pixel is noise, the pixel level of the target pixel is corrected with a noise removal filter to remove the noise. While various noise detecting schemes are known and there are various types of noise removal filters (e.g., averaging filters, median filters, etc.), this preferred embodiment may adopt any arbitrary scheme. The noise reduction process is not described in detail herein because the processing itself is well known.

The image processing module 22 applies the noise reduction processing to the input image data and stores, in the SDRAM 7 through the memory interface 26, information about the positions of the noise-reduced pixels. The region-of-interest extracting block 30 refers to the positional information stored in the SDRAM 7 to extract the noise-reduced regions of the image data as regions of no-interest. Regions of interest may be extracted by the first or second method described above or a fourth method described later.

The image processing module 22 may only perform the detection of noise positions and the detection of noise levels in the positions, without performing the noise removing processing using a noise removal filter, in which case the image compression module 28 performs the noise removal. That is, it is possible to substantially remove noise by notifying the image compression module 28 of the noise positions and levels as the mask signal so that a code rate control block 110 (see FIG. 5) in the image compression module 28 assigns the amounts of code in such a way that the amounts of code of pixels of higher noise levels are reduced to greater extents. This offers the same effect as the noise removal with a noise removal filter.

According to the third method, the region-of-interest extracting block 30 extracts, as regions of no-interest, the regions of image data that are noise-reduced by the image processing module 22. Accordingly, noise is never set as a region of interest and so it is possible to previously avoid the problem that noise is enhanced by the image enhancement processing by the image compression module 28.

The region-of-interest extracting block 30 may extract low-frequency components in the image data as regions of no-interest, independently of whether the noise reduction processing is done or not.

<Fourth Method>

With the mobile phone device equipped with a digital camera function according to this preferred embodiment, a user can operate the operating button section 5 shown in FIG. 1 to arbitrarily select an image mode, such as a portrait mode, a scenery mode, a night scene mode, a plant mode, and the like. Information indicating which image mode is being selected is reported from the CPU 20 of the main module 4 to the CPU 24 of the image processing unit 9.

Also, colors to be extracted as regions of interest or objects to be extracted as regions of interest, or both colors and objects, are previously determined for each image mode, and the associations are stored in a nonvolatile memory, e.g., in the flash memory 8. When a plurality of colors or objects are set to be extracted, information indicating which colors or objects have higher priorities is previously determined for each image mode, and also stored in the flash memory 8.

For example, about colors, the portrait mode sets the skin color of the face, and black or brown of the hair, as colors to be extracted as regions of interest. In the same way, the scenery mode sets the blue of the sky, and the red of the sunset, the night scene mode sets the white of stars and light, and the plant mode sets red, yellow, white of petals, and green of leaves, as colors to be extracted as regions of interest. As for the objects, for example, the portrait mode sets the whole body, or the upper half of the body, or the contour of the face, as objects to be extracted as regions of interest, and the plant mode sets contours of various kinds of petals and leaves as objects to be extracted.

As for the priorities, when the portrait mode sets skin color and black as colors to be extracted as regions of interest, for example, information indicating that the skin color has priority over black is set as priority information about the portrait mode.

On the basis of these pieces of information stored in the flash memory 8 and the information about the image mode reported from the CPU 24, the region-of-interest extracting block 30 extracts regions of interest according to the selected image mode, from the image data outputted from the image processing module 22. Also, on the basis of the priority information stored in the flash memory 8, the priority setting block 31 assigns priorities among the plurality of regions of interest extracted by the region-of-interest extracting block 30. The setting of priorities may be achieved manually through operations of the operating button section 5 by the user.

While various schemes of extracting objects from image data are known, such as extraction by binarization, extraction by edge detection, etc., this preferred embodiment may adopt any arbitrary extracting scheme.

For example, in a process of extracting the face of a person in the portrait mode, a method may be employed in which image parts in an original image are scanned to detect a position where the skin-color histogram attains its maximum in the original image, and the image part is sequentially expanded in the detected position to extract the face of the person (see Japanese Patent Application Laid-Open No. 2005-44033 by the applicant of the present invention). Alternatively, also in a process of extracting the face of a person in the portrait mode, a method may be employed in which a matching is done between an image obtained by Log-Polar-transforming an original image and a repetitive pattern image obtained by Log-Polar-transforming a prepared template image of the human face and repeating the Log-Polar-transformed template image, so as to extract person's face from the original image (see Japanese Patent Application Laid-Open No. 2004-310243 by the applicant of the present invention). Or, these two extraction schemes may be applied to one original image in order to enhance the extracting accuracy, in which case an object extracted by both of the two schemes will be extracted as the face of a person.

According to the fourth method, the region-of-interest extracting block 30 extracts, as regions of interest, at least one of particular color and particular object previously set for each image mode. Accordingly, in the image enhancement processing by the image compression module 28, it is possible to enhance a subject (for example, a person in the portrait mode) that is the target of the photographing by the user, accordingly to the image mode.

<Fifth Method>

The first to fourth methods have shown examples in which the extraction of regions of interest and the setting of priorities are both automatically performed, but the extraction and the setting may be manually achieved by a user. The user can select an automatic operation or manual operation by operating the operating button section 5.

Referring to FIG. 1, in a preview mode before an image is stored, the screen of the display device 6 displays a preview image. In this state, a rectangular-shaped or oval-shaped cursor, for example, is displayed on the preview image, and the user moves the cursor by operating the operating button section 5 so as to specify an area to be set as a region of interest. The specified area is displayed on the screen in an on-screen-display (OSD) manner, and the user takes a picture so that the object set as a region of interest is within that area. A plurality of regions of interest may be set, in which case the user operates the operating button section 5 to assign priorities (priority order) to the individual regions of interest. Alternatively, higher priorities may be automatically assigned in the order in which the areas are specified as regions of interest.

The user may take a picture with the image enhancement function of the invention being off, by operating the operating button section 5. An image thus taken is stored in the flash memory 8 or an external memory card, for example. In the stored image replay mode, the screen of the display device 6 displays the stored image. In this state, with a cursor displayed on the stored image in the above-described manner, an area to be set as a region of interest can be specified by moving the cursor. Also, in the manner mentioned above, a plurality of regions of interest may be set, and priorities may be manually or automatically assigned to the individual regions of interest.

Thus, the fifth method allows the user to manually set regions of interest and priorities. Accordingly, when the automatic extraction and automatic setting by the first to fourth methods do not provide a satisfactory image enhancement effect, for example, the setting can be switched to manual operation to obtain an image desirable for the user.

Next, the image compression module 28 shown in FIG. 1 will be described.

FIG. 5 is a block diagram illustrating the configuration of the image compression module 28. As shown in FIG. 5, the image compression module 28 includes a DC level shifting block 102, a color space transform block 103, a tiling block 104, a DWT block 105, a quantization block 106, an ROI block 51, a coefficient bit modeling block 108, an arithmetic coding block (entropy coding block) 109, a code rate control block 110, an image quality control block 52, and a bit stream generating block 111. All or part of the processing components of the image compression module 28 may be formed of hardware, or a program or programs for causing a microprocessor to function.

Image data inputted from the image processing module 22 of FIG. 1 to the image compression module 28 undergoes, as needed, DC level shifting in the DC level shifting block 102, and is then inputted to the color space transform block 103. The color space transform block 103 applies color space transform to the image data inputted from the DC level shifting block 102. As for the color space transform, the JPEG 2000 system prepares Reversible Component Transformation (RCT) and Irreversible Component Transformation (ICT), and one of them may be selected appropriately. Thus, the input RGB signal is transformed into a YCbCr signal or a YUV signal.

The tiling block 104 divides the image data inputted from the color space transform block 103 into a plurality of rectangular-shaped region components called "tiles". It is not essential to divide the image data into tiles, and one frame of image data outputted from the color space transform block 103 may be intactly inputted to the DWT block 105.

The DWT block 105 applies an integer type or real-number type DWT on a tile basis, to the image data inputted from the tiling block 104. Thus, the image data is recursively band-divided into high-band and low-band components according to the octave division scheme described earlier. As a result, as shown in FIG. 10, transform coefficients of a plurality of band components (sub-bands) with different resolutions are generated. More specifically, a real-number DWT uses filters of, e.g., 9×7 taps, 5×3 taps, or 7×5 taps, and an integer DWT uses filters of, e.g., 5×3 taps or 13×7 taps. These filter processing may be achieved by convolution, or by lifting scheme that is more efficient than convolution.

The quantization block 106 applies scalar quantization to the transform coefficients inputted from the DWT block 105 according to quantization step size $\Delta_b$ determined by the image quality control block 52. The method of quantization by the image quality control block 52 and the quantization block 106 will be described later. The transform coefficients QD outputted from the quantization block 106 undergo block-based entropy coding by the coefficient bit modeling block 108 and the arithmetic coding block 109, and then undergo rate control in the code rate control block 110.

Figure 12:
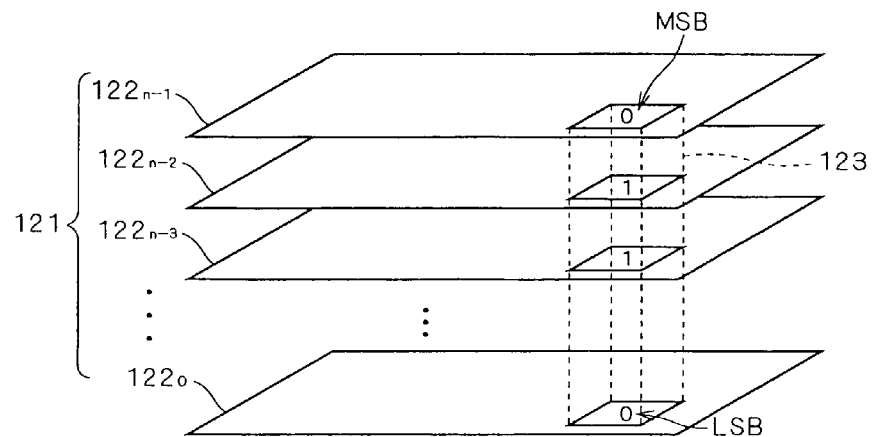
FIG. 12 is a schematic diagram illustrating n bit planes forming a code block.

The coefficient bit modeling block 108 divides the band components of the inputted transform coefficients QD into code blocks of, e.g., 16×16, 32×32, or 64×64, and further decomposes each code block into a plurality of bit planes formed of two-dimensional arrangements of bits. As a result, as shown in FIG. 12, each code block is decomposed into a plurality of bit planes $122_0$ to $122_{n-1}$.

The arithmetic coding block 109 applies arithmetic coding to the code data BD inputted from the coefficient bit modeling block 108. Other entropy coding scheme may be adopted in place of the arithmetic coding.

On the basis of an instruction from the image quality control block 52, the code rate control block 110 controls the rate of the code data AD inputted from the arithmetic coding block 109. Specifically, according to a target amount of code (the amount of code of the final compressed image), the code rate control block 110 performs a post-quantization by sequentially truncating the code data AD starting from lower priority, in a band-component by band-component manner, or a bit-plane by bit-plane manner, or a pass by pass manner. The rate control by the code rate control block 110 will be described in detail later.

The bit stream generating block 111 multiplexes the code data CD inputted from the code rate control block 110 with additional information (header information, layer structure, scalability information, quantization table, etc.), thereby generating a bit stream, and provides it as compressed image data to the image processing unit 9 shown in FIG. 1.

<Quantization>

Next, the quantization processing performed by the image quality control block 52 and the quantization block 106 shown in FIG. 5 will be described briefly.

On the basis of externally supplied target image quality information (high quality, standard quality, low quality, resolution information, etc), the image quality control block 52 has a function of determining quantization step size $\Delta_b$ for the quantization that the quantization block 106 applies to the transform coefficients inputted from the DWT block 105. The method of determining quantization step size $\Delta_b$ will be described below.

When, as shown in FIG. 10, the original image is divided by the DWT block 105 into sub-bands (band components) of "XYn" (X and Y indicate high-band component H or low-band component L, and n indicates a decomposition level), the quantization step size $\Delta_b$ for the quantization of each sub-band is determined as shown by the expression (1) below.

$$\Delta_b = Q_p/Q_b \quad (1)$$

Where $Q_p$ is a quantization parameter that is inputted according to the target image quality information, which has a smaller value as the image quality becomes higher. $Q_b$ is a quantization coefficient in each sub-band.

$Q_b$ is represented by the expression (2) below as a norm of composition filter coefficients.

$$Q_b = \sqrt{G_b} \quad (2)$$

The weighting coefficient $G_b$ of a sub-band b is an inner product of composition filter coefficients.

In place of the method above, the quantization step size $\Delta_b$ may be determined while considering human visual sight characteristics. Such a method is described below.

David S. Taubman and Michael W. Marcellin, "JPEG2000 IMAGE COMPRESSION FUNDAMENTALS, STANDARDS AND PRACTICE," Kluwer Academic Publishers (which is hereinafter referred to as Non-Patent Document 1) describes, in its Chapter 16, Weighted Mean Square Error (WMSE) based on Contrast Sensitivity Function of human visual system (CSF). According to the description, the expression (2) above is modified to the expression (3) below in order to improve human visual evaluation about compression-coded image data.

$$Q_b = \sqrt{W_{b[i]}^{csf} G_{b[i]}} \quad (3)$$

In the expression (3) above, $W_{b[i]}^{csf}$ is called "energy weighting factor" of sub-band b[i], and recommended values of $W_{b[i]}^{csf}$ are shown in ISO/IEC JTC 1/SC 29/WG1 (ITU-T SG8) N2406, "JPEG 2000 Part 1 FDIS (includes COR 1, COR 2, and DCOR3)", 4 Dec. 2001 (which is hereinafter referred to as Non-Patent Document 2). FIGS. 15 to 17 show values of the energy weighting factor shown in the Non-Patent Document 2.

In FIGS. 15 to 17, "level" and "Lev" indicate decomposition levels and "Comp" indicates luminance component Y and color difference components Cb and Cr, and the diagrams show examples in which "Viewing distance" is 1000, 1700, 2000, 3000, and 4000. The "Viewing distance 1000", "Viewing distance 1700", "Viewing distance 2000", "Viewing distance 3000", and "Viewing distance 4000" respectively mean viewing distances in which displays or printed matter of 100 dpi, 170 dpi, 200 dpi, 300 dpi, and 400 dpi are viewed at a distance of 10 inches.

The image quality control block 52 obtains quantization step sizes $\Delta_b$ in this way, and reports them to the quantization block 106. Then, the quantization block 106 applies quantization to each sub-band according to the reported quantization step size $\Delta_b$.

It should be noted that, when the value of a quantization step size $\Delta_b$ is smaller than 1, it is multiplied by a power of 2 so that the value becomes 1 or more, and the quantization step size $\Delta_b$ of 1 or more is adopted. For example, when the expression (1) gives a quantization step size $\Delta_b$ of 0.47163, the actual quantization of image data is performed by using a quantization step size $\Delta_b=1.88652$ obtained by multiplying the value by $2^2$.

<Setting of ROI Portions>

The ROI block 51 shown in FIG. 5 develops the mask signal inputted from the mask signal generating module 23 of FIG. 1 into the wavelet plane, and gives the setting information about the ROI portions on the wavelet plane to the code rate control block 110.

Now, the development of ROI portions is performed for each code block obtained by dividing the image data, which has been subjected to DWT and developed in the wavelet plane, into rectangular regions of a given size. Specifically, for example, each sub-band is divided into code blocks of a given size, e.g., vertical 32 pixels ×horizontal 32 pixels, and the mask signal is developed on the wavelet plane for each code block, indicating whether it is an ROI portion and the priority assigned thereto when it is an ROI portion. When a plurality of ROI portions with different priorities are included in one code block, that code block is handled as belonging to a higher-priority ROI mask.

Figure 6:
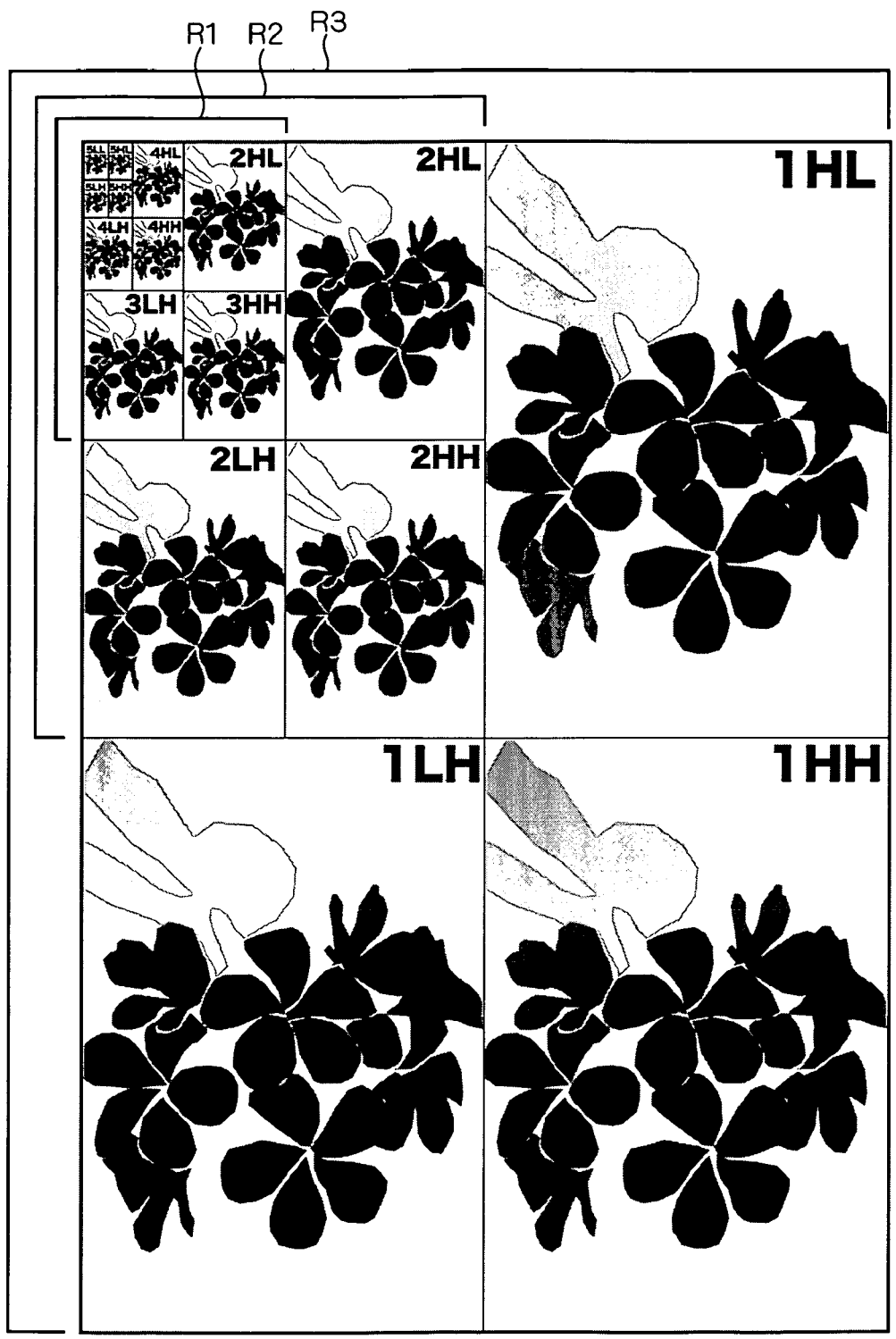
FIG. 6 is a diagram illustrating a mask signal developed in a wavelet plane.

As a result, the wavelet plane as shown in FIG. 6 is developed according to the mask signal shown in FIG. 4, for example. The setting information about the ROI portions is provided as input to the code rate control block 110.

<Reordering and Bit Shifting>

The code rate control block 110 shown in FIG. 5 performs reordering and bit shifting of the code data AD inputted from the arithmetic coding block 109, on the basis of the quantization step sizes $\Delta_b$ reported from the image quality control block 52.

First, when a certain value of quantization parameter $Q_p$ is specified as a target image quality, the image quality control block 52 calculates the quantization step sizes $\Delta_b$ in the above-described manner on the basis of the value of the quantization parameter $Q_p$, and reports them to the code rate control block 110. Then, according to the values of the quantization step size $\Delta_b$, the code rate control block 110 reorders the quantized data in ascending order of values, i.e., starting from smaller value.

As for data that is quantized with a quantization step size $\Delta_b$ that has been converted to become 1 or more as described above, while the reordering is done on the basis of the converted quantization step size $\Delta_b$, the data is bit-shifted to the left by the number of bits corresponding to the exponent of the power of 2 by which the quantization step size $\Delta_b$ was multiplied for the conversion.

Figure 7:
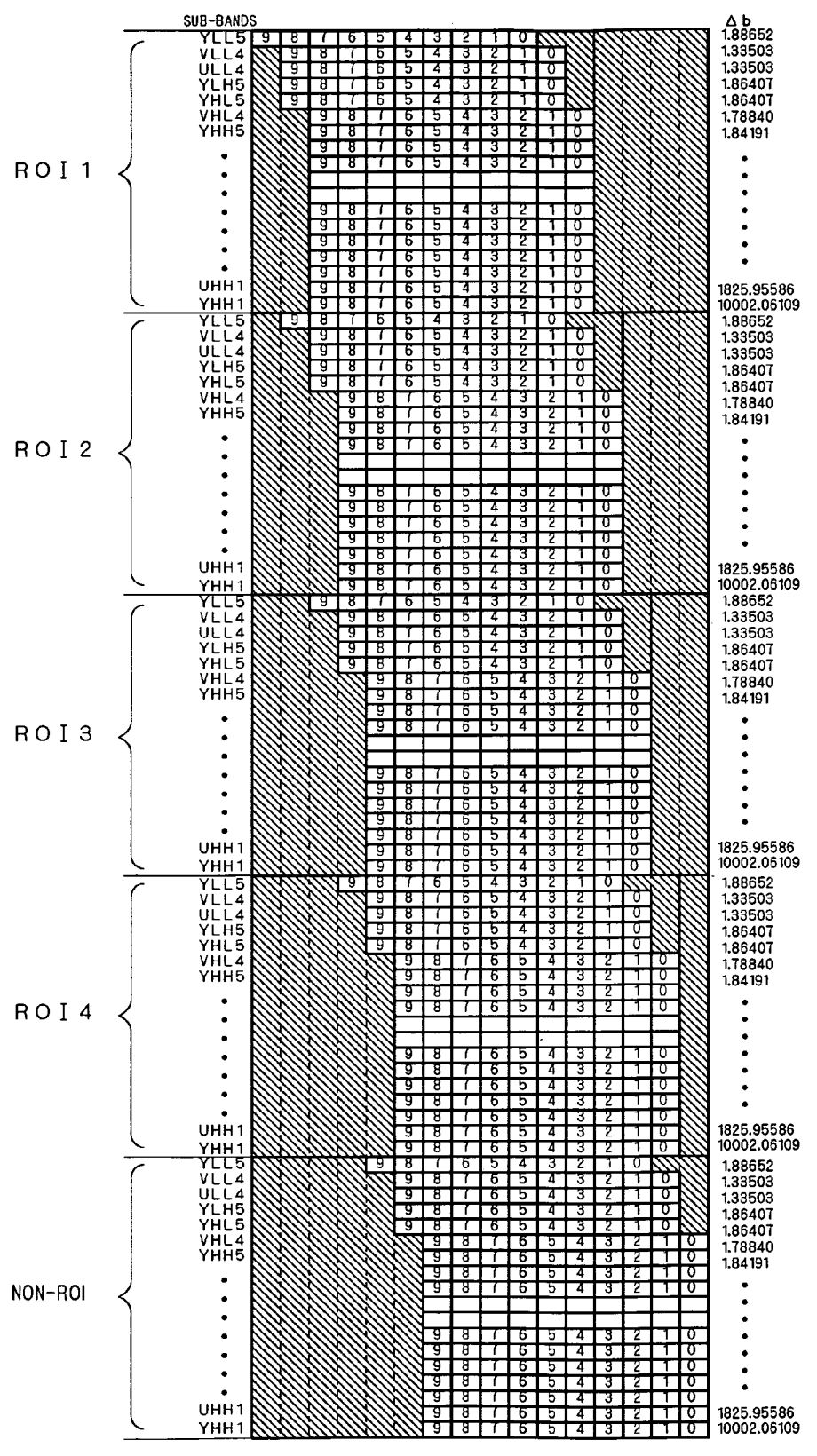

Also, the code rate control block 10 divides the reordered and bit-shifted code rows into ROI data and non-ROI data on the basis of the setting information (FIG. 6) about the ROI portions reported from the ROI block 51. That is to say, as shown in FIG. 7, the code rate control block 110 divides the data into data about the four ROI portions (ROI1 to ROI4) and data about the non-ROI portion on the basis of the setting information (FIG. 6) about the ROI portions reported from the ROI block 51.

Next, the code rate control block 110 bit-shifts the pieces of data about the ROI portions (ROI1 to ROI4) by given numbers of bits to the left. In this process, a plurality of ROI portions of different priorities are set, and the amount of shift is set larger as the priority is higher. For example, in FIG. 7, with respect to the data about the non-ROI portion, the lowest-priority ROI portion (ROI4) is bit-shifted by 1 bit to the left, and the next, higher-priority ROI portion (ROI3) is shifted by 2 bits to the left, and the next, higher-priority ROI portion (ROI2) is shifted by 3 bits, and the highest-priority ROI portion (ROI1) is shifted by 4 bits to the left.

The amounts of shift of the data about the ROI portions (ROI1 to ROI4) may be predetermined numbers of bits, or may be varied to arbitrary values depending on, e.g., the target image quality of the compression-coded image data. Also, the data about the ROI portions (ROI1 to ROI4) and the data about the non-ROI portion may be arranged starting from lower-priority data, for example, instead of starting from higher-priority data as shown in FIG. 7.

<Code Rate Control>

Next, the code rate control block 110 applies omission of data to the reordered and bit-shifted code rows as shown in FIG. 7 so that the total amount of data is within a given amount or a target amount of code. The data is omitted sequentially from a rightmost bit. For example, with the data shown in FIG. 7, data is sequentially omitted downward starting from the bit data of number 0 of VHL4 of the code row 40 in the non-ROI portion. Then, when the total amount of data is within the given amount when the bit data has been omitted to number 0 of YHH1, the corresponding data portion is omitted. When the total amount of data is not within the given amount even when data is omitted to number 0 of YHH1, then the data is next omitted sequentially downward from the bit data of number 0 of VHL4 of the ROI portion (ROI4). The omission of bit data is continued sequentially from the rightmost bits until the total amount of data is within the target amount of code.

Figure 13:
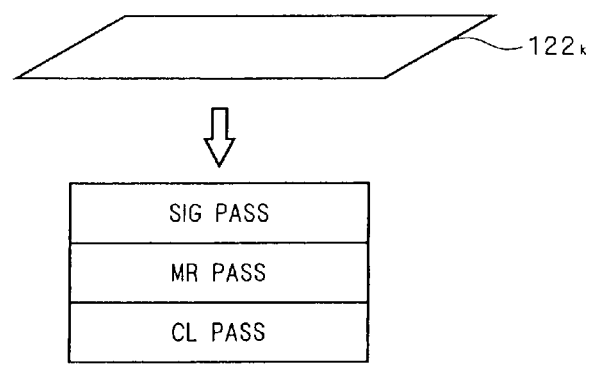
FIG. 13 is a schematic diagram illustrating three kinds of coding passes.
Figure 14:
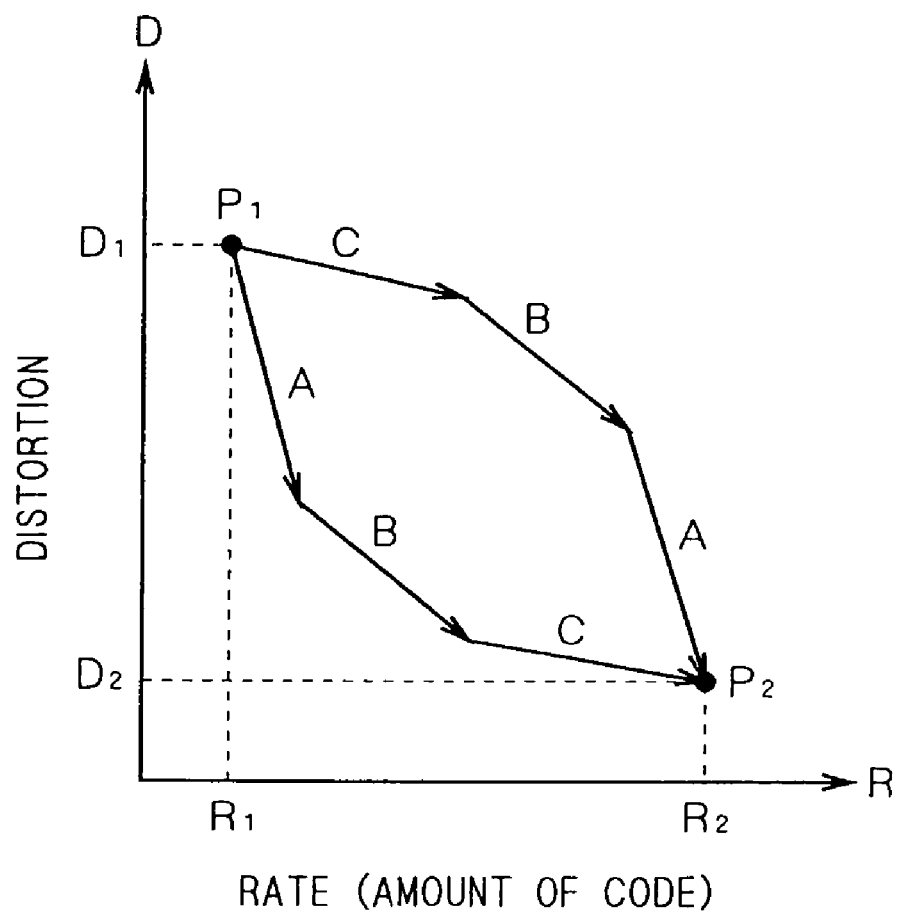
FIG. 14 is a diagram showing an R-D curve illustrating a relation between rate and distortion.

As shown in FIG. 13, bit data (a bit plane) can be decomposed into SIG pass, MR pass, and CL pass. The rate control by the code rate control block 110 may be performed pass by pass, instead of bit plane by bit plane.

This rate control is not needed when the total amount of code data AD is already under a user-expected target amount when the data is inputted to the code rate control block 110.

In this way, in the rate control by the code rate control block 110, bit data of each sub-band is reordered and bit-shifted on the basis of the setting information about ROI portions, and is sequentially omitted in order of non-ROI portion, lower-priority ROI portions, and higher-priority ROI portions. As a result, the amounts of code are controlled so that larger amounts of code are assigned to regions of interest with higher priorities, which makes it possible to perform the compression coding while maintaining image quality of regions of interest having higher priorities. In other words, it is possible to enhance the image in areas corresponding to the regions of interest, while compressively coding the entire image.

<User Operation Sequence>

Figure 8:
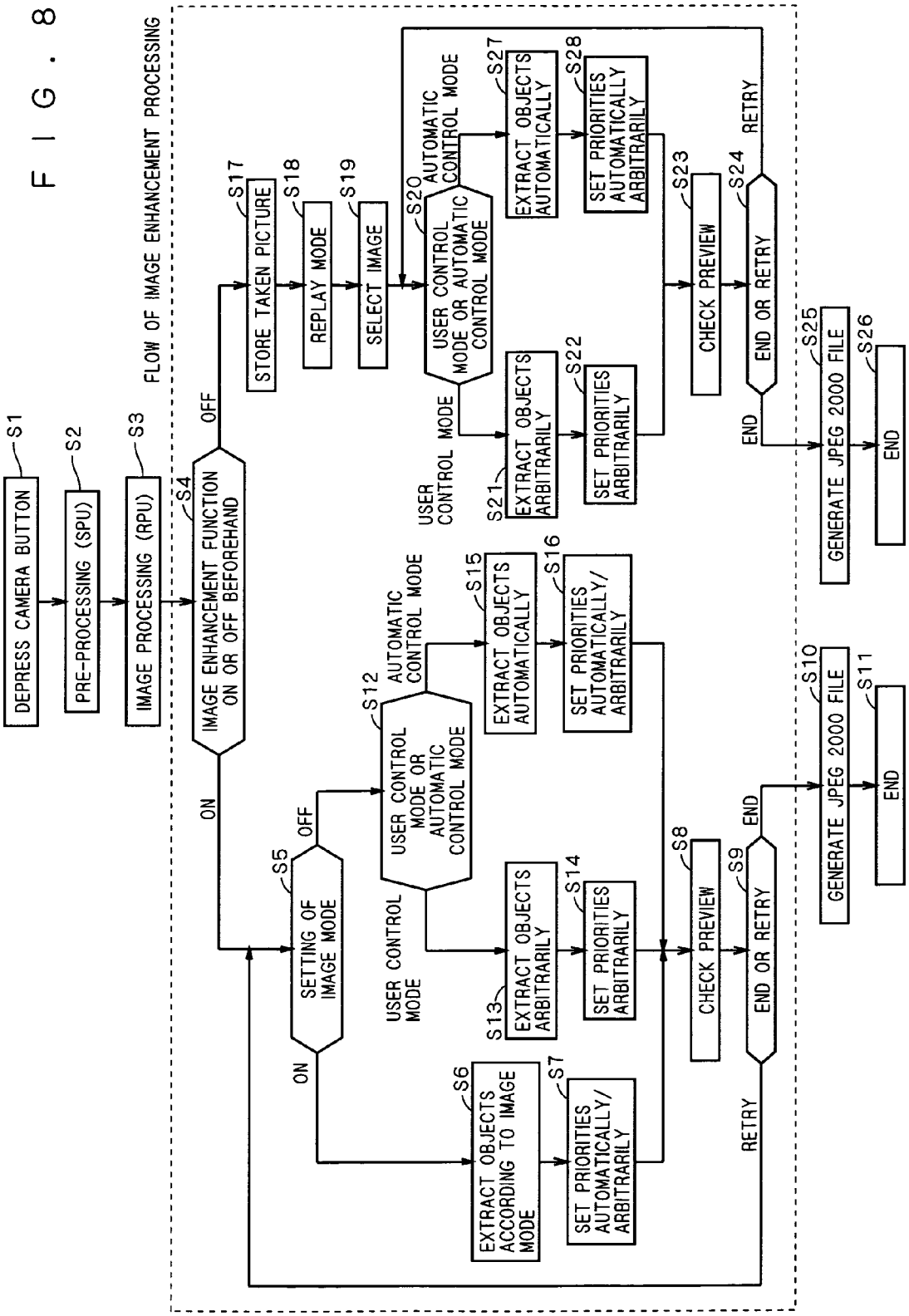
FIG. 8 is a flowchart of a sequence of operations that a user follows when taking a picture with the mobile phone device equipped with a digital camera function according to the preferred embodiment of the invention.
Figure 9:
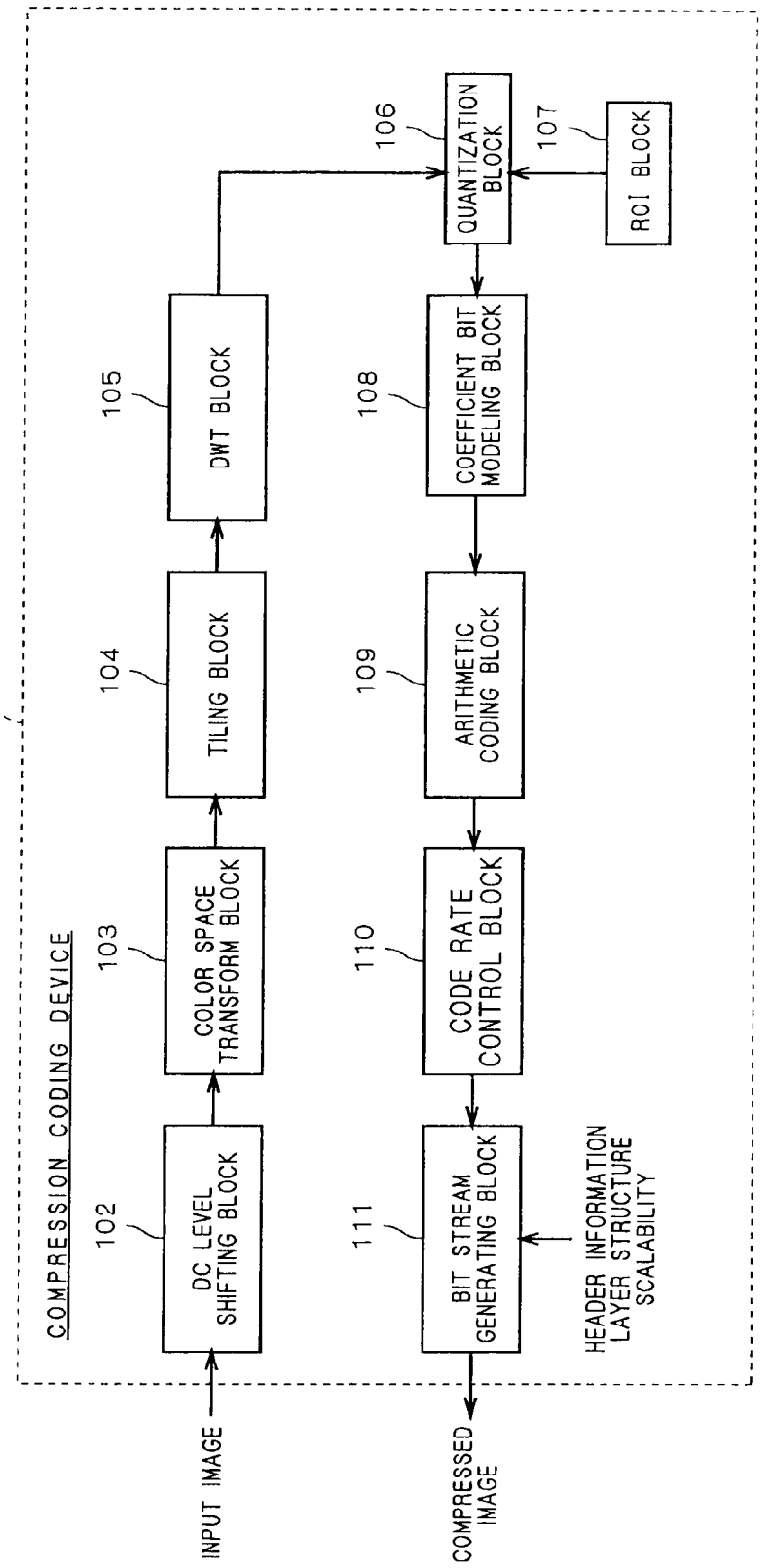
FIG. 9 is a functional block diagram schematically showing the configuration of a compression coding device that applies compression coding to images on the basis of the JPEG 2000 system.

FIG. 8 is a flowchart showing a sequence of operations that a user follows when taking a picture with a mobile phone device equipped with a digital camera according to this preferred embodiment. The sequence of operations will now be described referring to FIGS. 1, 5, and 8.

In the preview mode, as mentioned earlier, the screen of the display device 6 displays a preview image. In this state, the user depresses a camera button in Step S1, and the sensor signal processing module 21 performs pre-processing in Step S2 in the manner described earlier, and next the image processing module 22 performs various image processings in Step S3 in the manner described earlier.

Next, in Step S4, a determination is made as to whether the image enhancement function is set on or off. With the mobile phone device of this preferred embodiment, the user can previously select whether to effect the image enhancement process before storing a picture, by operating the operating button section 5.

When the image enhancement function is on (when the determination of Step S4 is "ON"), a determination is next made in Step St. as to whether an image mode is set or not. With the mobile phone device of this preferred embodiment, the user can previously select an image mode (portrait mode, scenery mode, night scene mode, plant mode) by operating the operating button section 5.

When an image mode is being set (when the determination of Step St. is "ON"), a plurality of regions of interest are automatically extracted in Step S6 from the taken image in correspondence with the selected image mode, according to the fourth method described above. Next, in Step S7, as described above, priorities are set automatically or manually respectively to the plurality of extracted regions of interest. Then, the mask signal generating module 23 generates a mask signal and the generated mask signal is inputted to the image compression module 28.

Subsequently, the image compression module 28 performs the compression coding process. In this process, the ROI block 51 develops the mask signal in the wavelet plane and the code rate control block 10 controls the rate only about a sub-band of a necessary minimum resolution required to make a display on the display device 6 (e.g., the region R1 of FIG. 6). In this way, for a preview display, the development of the mask signal in the wavelet plane and the rate control are applied only to a sub-band of a resolution required for the preview, which avoids unnecessary, wasteful operations and shortens the processing time for the preview.

Next, in Step S8, an image-enhanced picture is previewed on the screen of the display device 6. Next, in Step S9, a message is displayed on the screen together with the image so as to ask whether to store the image.

When the user operates the operating button section 5 to give an instruction not to store the image (when the determination of Step S9 is "retry"), the flow returns to Step S5. On the other hand, when the user operates the operating button section 5 to store the image (when the determination of Step S9 is "end"), a JPEG 2000 image file is generated in Step S10. Specifically, the development of mask signal in the wavelet plane and the rate control are performed again with a sub-band of a resolution corresponding to the data size of the image to be stored. Now, with the mobile phone device of this preferred embodiment, the user can select a data size of the image to be stored through the operating button section 5. For example, the data size of the image to be stored can be selected for various purposes, such as for a display on the screen of the display device 6, for transmission using electronic mail, for a display on the screen of a personal computer (PC), or for printing with a printer. For example, when an image is stored for a display on the screen of a PC, the processes are performed again only with a sub-band of the corresponding resolution (e.g., the region R2 of FIG. 6). As for another example, when the image is stored for printing with a printer, the processes are performed again with a sub-band of the corresponding resolution (e.g., the region R3 of FIG. 6).

In this way, when storing a taken image, the mask signal development in the wavelet plane and the rate control are performed only with a sub-band of a resolution corresponding to a user-selected data size of the image to be stored, which avoids unnecessary wasteful processing and shortens the processing time, and which also allows generation of a JPEG 2000 file suitable for the purpose of use.

After the taken image is stored, the process ends (Step S11).

When no image mode is selected in Step St. (when the determination of Step S5 is "OFF"), a determination is next made in Step S12 as to whether a manual control mode (a user control mode) is selected or an automatic control mode is selected. The selection of the manual control mode or the automatic control mode can be previously made by the user through operation of the operating button section 5.

When the user control mode is selected, the user manually sets a plurality of regions of interest from the taken image according to the above-described fifth method (Step S13), and then manually sets priorities of the plurality of regions of interest (Step S14). The flow then moves to Step S8.

When the automatic control mode is selected, a plurality of regions of interest are automatically extracted according to the above-described first to third methods (Step S15) on the basis of the results of signal processing in the image processing module 22, and then priorities are set automatically or manually in the manner described above (Step S16). The flow then moves to Step S8.

In Step S4, when the image enhancement function is off (when the determination of Step S4 is "OFF"), the taken image is stored in Step S17 without undergoing the image enhancement process by the image compression module 28.

Next, a replay mode is started in Step S18 and an image to be replayed is selected in Step S19, and a determination is made in Step S20 as to whether the manual control mode (user control mode) is selected or the automatic control mode is selected. As mentioned above, the selection of the manual control mode or automatic control mode can be previously made by the user through operation of the operating button section 5.

When the user control mode is selected, the user manually sets a plurality of regions of interest from the replayed image according to the above-described fifth method (Step S21), and then manually sets priorities of the plurality of regions of interest (Step S22). Next, in Step S23, as in Step S8, an image-enhanced replay image is previewed on the screen of the display device 6. Next, in Step S24, a message is displayed on the screen together with the image in order to ask whether to store the image.

When the user operates the operating button section 5 to give an instruction not to store the image (when the determination of Step S24 is "retry"), the flow returns to Step S20. On the other hand, when the user gives an instruction to store the image through operation of the operating button section 5 (when the determination of Step S24 is "end"), a JPEG 2000 image file is generated in Step S25 in the same manner as in Step S10, whereby the image is stored and the process ends (Step S26).

When the automatic control mode is selected in Step S20, a plurality of regions of interest are automatically extracted (Step S27) according to the above-described first to third methods, on the basis of the results of signal processing in the image processing module 22, and then priorities are set automatically or manually as described above (Step S28). The flow then moves to Step S23.

As has been described so far, according to the mobile phone device equipped with a digital camera function according to this preferred embodiment, the mask signal generating module 23 includes the region-of-interest extracting block 30 that extracts a plurality of regions of interest from input image data, and a priority setting block 31 that sets priorities to the individual regions of interest. Then, the code rate control block 110 of the image compression module 28 controls the amount of code in such a way that larger amounts of code are assigned to regions of interest of higher priorities. This makes it possible to achieve compression coding while maintaining image quality of higher-priority regions of interest, thereby making it possible to enhance the image portions corresponding to the regions of interest, while compressively coding the entire image.

Also, as has been described in the first to fifth methods, the region-of-interest extracting block 30 extracts regions of interest by extracting at least one of particular colors and particular objects from the image data. Accordingly, unlike in the conventional method in which objects with larger motion vectors are extracted as regions of interest, still objects and objects with smaller motion vectors can be extracted as regions of interest. Furthermore, because the process does not require comparing at least two successive images, there is no need for increased circuit scale and more complex processing. Also, unlike in the conventional method in which a central area of an image is extracted as a region of interest, it is possible to extract an important object as a region of interest even when the important object is not included in tiles in a central area. Moreover, unlike in the conventional method using object template matching, increased circuit scale is not needed because there is no need to previously store a huge amount of template data about various objects in memory.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having embedded therein instructions, which when executed by a computer, cause the computer to perform a method of an image enhancement device, comprising:

extracting, by the image enhancement device, a plurality of regions of interest from input image data;

setting, by the image enhancement device, a different priority for each of said plurality of regions of interest based on predetermined priority information associated with a color; and controlling, by the image enhancement device, a code rate in such a way that larger amounts of code are assigned to said plurality of regions of interest having higher ones of said priorities, wherein said image data is data about an image taken by a camera that includes a plurality of imaging modes, said extracting step comprises extracting said plurality of regions of interest by extracting at least a particular color from said image data and extracting, as said plurality of regions of interest, said particular color that is previously determined for a selected one of the plurality of imaging modes, and each one of the plurality of imaging modes sets a plurality of colors to be extracted as the plurality of regions of interest.

2. The non-transitory computer-readable storage medium according to claim 1, wherein said extracting step comprises extracting said plurality of regions of interest from said input image data based on extraction information associated with a selected one of a plurality of imaging modes, and the plurality of imaging modes includes at least one or a combination of a portrait mode, a scenery mode, and a night scene mode.

3. An image enhancement device, comprising:

a region-of-interest extracting block that extracts a plurality of regions of interest from input image data;

a priority setting block that sets a different priority for each of said plurality of regions of interest based on predetermined priority information associated with a color;

a code rate control block that controls a code rate in such a way that larger amounts of code are assigned to said plurality of regions of interest having higher ones of said priorities; and a processor that communicates with at least one of the region-of-interest extracting block, the priority setting block, and the code rate control block, wherein said image data is data about an image taken by a camera that includes a plurality of imaging modes, said region-of-interest extracting block extracts said plurality of regions of interest by extracting at least a particular color from said image data and extracts, as said plurality of regions of interest, said particular color that is previously determined for a selected one of the plurality of imaging modes, and each one of the plurality of imaging modes sets a plurality of colors to be extracted as the plurality of regions of interest.

4. The image enhancement device according to claim 3, wherein said region-of-interest extracting block extracts said plurality of regions of interest from said input image data based on extraction information associated with a selected one of a plurality of imaging modes, and the plurality of imaging modes includes at least one or a combination of a portrait mode, scenery mode, and night scene mode.

5. The image enhancement device according to claim 3, further comprising a wavelet transform block that recursively band-divides said image data into a high-band component and a low-band component through a wavelet transform, so as to generate a plurality of sub-bands having different resolutions, wherein said image data is data about an image taken by a camera that has a preview function and an image storing function, and for a preview, said code rate control block applies amount-of-code assignment control only to a first sub-band having a resolution necessary for the preview, and for storing of the image, said code rate control block applies said amount-of-code assignment control to a second sub-band having a higher resolution than said first sub-band.

6. The image enhancement device according to claim 5, wherein said camera has a function of selecting a data size of the image to be stored when storing the image, and for the storing of the image, said code rate control block applies said amount-of-code assignment control only to said second sub-band that corresponds to said selected data size.

* * * * *